Feb. 5, 1952 — W. J. PRATT ET AL — 2,584,158
RECOVERY OF LACTOSE FROM MOTHER LIQUOR
Filed Jan. 10, 1950
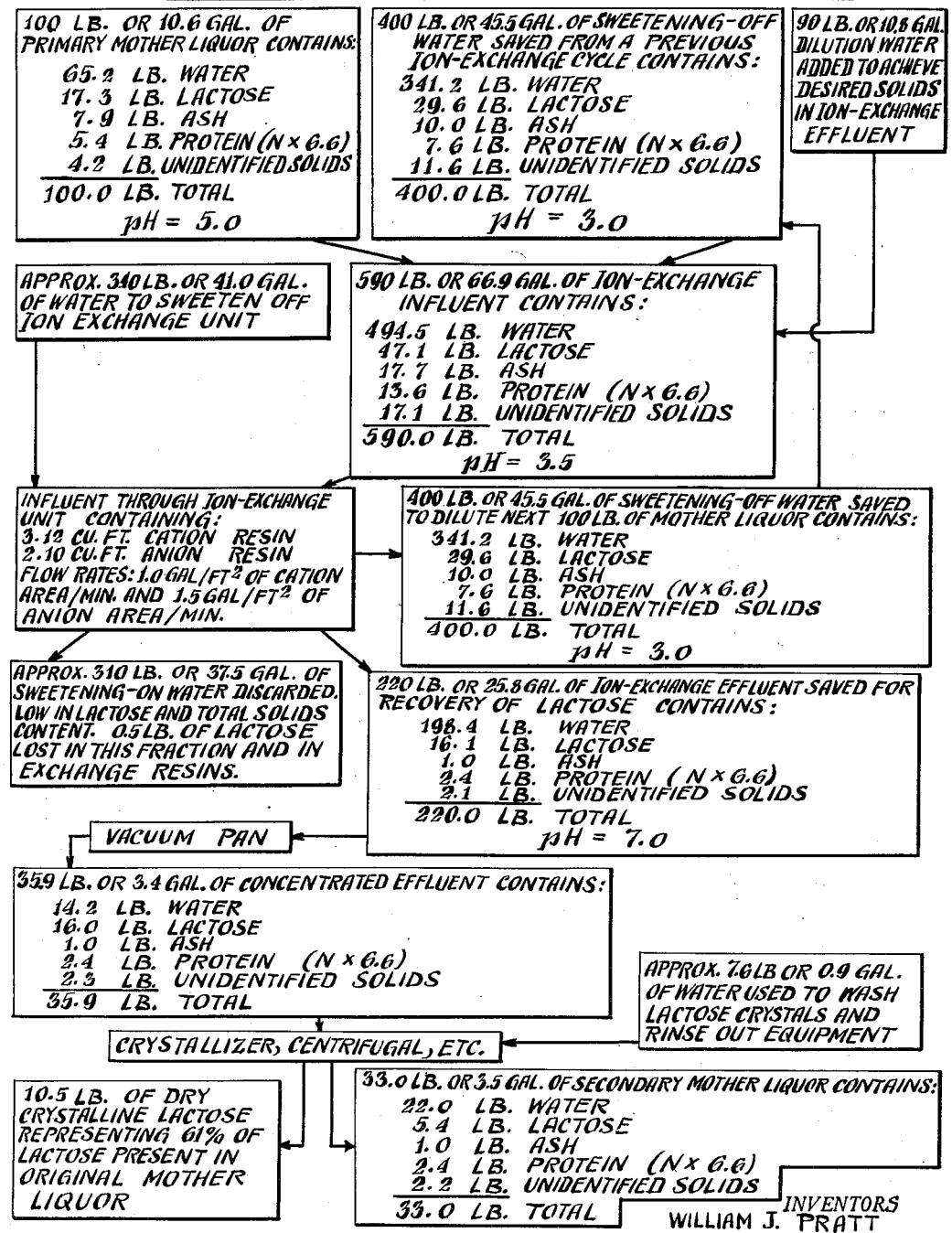
INVENTORS
WILLIAM J. PRATT
HOWARD F. SEIBERT
REXFORD C. STRIBLEY
BY Marston L. Hamlin
ATTORNEY Patented Feb. 5, 1952

2,584,158

UNITED STATES PATENT OFFICE 2,584,158

RECOVERY OF LACTOSE FROM MOTHER LIQUOR

William J. Pratt, East Paterson, N. J., and Howard F. Seibert and Rexford C. Stribley, Mason, Mich., assignors to Wyeth Incorporated, Philadelphia, Pa., a corporation of Delaware Application January 10, 1950, Serial No. 137,698

3 Claims. (Cl. 127—31)

This invention relates to a process for the recovery of lactose from mother liquor such as lactose-containing mother liquor produced as a by-product in conventional recovery of lactose from whey.

The methods of recovering lactose from cheese whey or casein whey, as usually practiced, involve the steps of deproteinizing the whey, concentrating the deproteinized whey to about 30 percent solids content, filtering, further concentrating to about 60 percent solids content, and permitting the lactose to crystallize from the concentrate. After crystallization is complete the lactose is usually recovered and washed in centrifugals of the basket type. With good plant practice, a recovery of between 50 percent and 60 percent of the theoretical yield of lactose may be obtained in one crystallization, yielding a lactose of sufficient purity for most purposes. Modifications of technique may yield greater amounts of lactose on the first crystallization but the lactose will be of poor quality, necessitating additional crystallizations, which in turn will yield 50 percent to 60 percent of the theoretical amount. The recrystallized lactose will be of sufficiently high purity for most purposes. Yields of crystallized lactose may average 2.5 lb. to 3.0 lb. of lactose for 100 lb. of whey processed.

Any method for the recovery of lactose by crystallization from concentrated whey yields a mother liquor at the time the lactose is separated by centrifugation. Typical mother liquor derived from the first crystallization by the general methods discussed above may contain about 35 percent solids or between 0.95 lb. and 1.15 lb. of mother liquor solids per 100 lb. of whey processed. Lactose may comprise approximately 40 percent to 50 percent of the total solids present in the mother liquor; accordingly approximately 0.5 lb. of lactose per 100 lb. of whey processed may be lost in the liquor. The remaining solids consist of ash, nitrogenous substances and unidentified solids.

Because of the amount and character of non-lactose materials concentrated in mother liquors produced in operations of the type described, further recovery of lactose by conventional crystallization methods has proved uneconomical and impractical. Accordingly a substantial fraction of the lactose originally present in the whey treated must be disposed of as a constituent of a low-grade by-product mother liquor.

Processes have been proposed by which a high yield of an edible lactose product may be obtained from whey without a crystallization step or the production of mother liquors containing lactose. Such processes involve deproteinization of the whey, demineralization by contact with cation- and anion-exchangers, and evaporation of the demineralized solution to dryness. The advantages of these processes are apparent, but such processes require a large capital investment for the installation of necessary equipment in lieu of the crystallizing equipment used in the above described conventional processes.

Since many lactose plants have a substantial investment in crystallizing equipment, which for one reason or another it does not appear advantageous to replace, it is one object of our invention to provide a process which will supplement the conventional processes described above and effect a substantially greater recovery of available lactose without requiring modification of the conventional steps or apparatus. It is another object of our invention to provide a process of this kind which is simple and economical to operate. It is a further object of our invention to provide a process which will result in an enhanced yield of lactose of an acceptable commercial grade. Other objects and advantages will be apparent, to those skilled in the art, from the following disclosure.

We have discovered that if lactose-containing mother liquors produced as described above are diluted and subjected to the demineralizing action of cation- and anion-exchange resins, as described below, their composition is so modified as to permit substantial further recovery of acceptable lactose by recrystallization. In arriving at this result we found to our surprise that, in thus demineralizing the diluted mother liquor to a degree such that at least 75 percent of the ash was removed, large fractions of nitrogenous material and unidentified solids present were also removed. For example, the action of demineralizing resins in removing approximately 86 percent ash from the diluted mother liquor also removed over 50 percent of the nitrogenous material, and nearly 50 percent of the remaining unidentified solutes. We attribute the success of our process in a considerable degree to this fact. The following table illustrates this change of composition in a typical mother liquor treated by our invention, the quantities being given in pounds:

TABLE 1

| | Mother liquor charged—lb. | Liquor produced for lactose recovery—lb. | Removed by process—lb. |
|---|---|---|---|
| Weight | 100 | 220 | |
| Lactose | 17.3 | 15.9 | 1.6 |
| Ash | 7.9 | 1.0 | 6.9 |
| Protein (N × 6.6) | 5.4 | 2.4 | 3.0 |
| Unidentified solids (by difference) | 4.2 | 2.2 | 2.0 |

From the liquor produced for lactose recovery approximately 10.5 lb. lactose, or 60 percent of that contained originally in the mother liquor treated, is recoverable by crystallization.

According to our invention lactose-containing mother liquor is diluted, demineralized by successive contacts with cation- and anion-exchange resins, and treated for the recovery of lactose by concentration and crystallization.

Mother liquors available for treatment by our process ordinarily contain 30–40 percent solids, usually about 35 percent. Approximately half, say 12–20 percent, of the solids is lactose.

Before demineralization the mother liquor is diluted to a solids content of 5–25 percent; a solids content in the neighbood of 15 percent, say 15±2 percent, has been found most satisfactory since too great a dilution places an undue cost burden on subsequent concentration steps and too high a concentration interferes with the efficiency and selectivity of the demineralizing step. The dilution may be accomplished by adding water alone or by adding sweetening-off water, i. e. a dilute lactose solution resulting from sweetening off in a previous demineralizing operation, or by adding a mixture of water and dilute lactose solution. Sweetening-off water will ordinarily contain 10–16, usually about 15 percent solids of which approximately half will be lactose.

The diluted mother liquor constitutes the influent to an ion-exchange unit which consists of tanks containing a bed of cation-exchange resin and a bed of anion-exchange resin connected in series in that order. Such an influent should contain 3–15 percent lactose and substantially smaller percentages of ash, protein (N×6.6) and unidentified solids.

More than one ion-exchange unit may be used in series, in which case the first unit is advantageously a partially exhausted unit which removes a major portion of the ions removed, and the second or last unit is a fresh or less exhausted unit which acts as a scavenger and completes the deionization. The units may thus be used in progressive rotation until their deionizing capacity is exhausted, after which they are regenerated and put on-stream again.

The first portion of effluent from the correctly balanced ion exchange units (sweetening-on water) contains no appreciable lactose and may be discarded. When the effluent has a density of 2° Baumé it may be saved for the recovery of lactose. From this point on, all effluent may be saved until a composite sample of the saved portion of effluent has a pH of 7.0. The ion exchange unit may be considered exhausted at this point. The flow of influent is then stopped and water is used to sweeten off the exchange units. Preferably only enough sweetening-off water is saved to dilute the primary mother liquor for the preparation of the typical influent described above since most of the recoverable lactose has been eluted from the resins at this point. The ion-exchange units may then be backwashed and regenerated by any recognized procedure and prepared for another operating cycle.

The effluent collected for lactose recovery will ordinarily be more dilute and have a smaller volume than the influent; its solids content should be 3–12 percent, preferably about 10 percent, a major portion of which, preferably about ¾, should be lactose.

The demineralizing operation raises the lactose content of the dissolved solids from about 50 percent to about 70–75 percent, while the ash, protein and unidentified solids are correspondingly reduced.

The effluent is then concentrated, as by evaporation in a vacuum pan, to a high solids content, usually 55–65 percent and preferably about 60 percent solids content, and the lactose allowed to crystallize out. This may be done by direct concentration of the effluent, or the effluent may be combined with other lactose-containing liquors before or after concentration but before crystallization. Specifically, the effluent may advantageously be combined with whey, e. g. deproteinized whey, after preliminary concentration, say to 30–35 percent solids, before the whey is concentrated to the crystallizing point.

Whichever method is used, a secondary or mixed secondary and primary mother liquor is formed, the solids in which have a reduced lactose content. Such secondary mother liquors may be further treated by our process, either alone or mixed with other lactose liquors, and such processes repeated until the mother-liquor solids have too large a content of impurities to permit further economical recovery of lactose.

A typical secondary mother liquor, which still contains recoverable lactose, may run as high as 30–40 percent solids, of which about ½ will be lactose. The ash will be a much lower fraction of total solids and the protein and unidentified solids a higher fraction than in the original influent; when these together exceed 65–70 percent of the total solids, further lactose recovery is usually uneconomical.

Two embodiments of our invention are described in the "Examples" below, but these are intended to be illustrative only and not to limit our invention, the scope of which is defined in the appended claims.

All percentages in this disclosure are percentages by weight unless otherwise specified.

*Example I*

The steps of our process embodied in this example are illustrated in the flow sheet constituting the accompanying drawing, the legends of which make it self-explanatory when read in connection with this description.

One hundred pounds, or 10.6 gal., of primary mother liquor derived from a conventional lactose crystallization operation and having the following composition:

TABLE 2

|  | Wet Basis | Dry Basis |
|---|---|---|
|  | Per cent | Per cent |
| Water | 65.2 | -------- |
| Lactose | 17.3 | 49.7 |
| Ash | 7.9 | 22.7 |
| Protein (N×6.6) | 5.4 | 15.5 |
| Unidentified Solids (by difference) | 4.2 | 12.1 |
| Total | 100.0 | 100.0 |

*Note.*—The portion referred to in all assays as unidentified solids includes: organic acids, lipids, and other unidentified constituents contributing to the total solids.

is diluted in a tank with 90 lb., or 10.8 gal., of water and 400 lb., or 45.5 gal., of sweetening-off water resulting from a previous operation and having the following composition:

TABLE 3

| | Wet Basis | Dry Basis |
|---|---|---|
| | Per cent | Per cent |
| Water | 85.3 | |
| Lactose | 7.4 | 50.3 |
| Ash | 2.5 | 17.1 |
| Protein (N×6.6) | 1.9 | 12.9 |
| Unidentified Solids (by difference) | 2.9 | 19.7 |
| Total | 100.0 | 100.0 |

It has a pH of 3.0.

The resulting dilute influent amounts to 590 lb., or 66.9 gal., and has the following composition:

TABLE 4

| | Wet Basis | Dry Basis |
|---|---|---|
| | Per cent | Per cent |
| Water | 83.9 | |
| Lactose | 7.9 | 49.1 |
| Ash | 3.0 | 18.7 |
| Protein (N×6.6) | 2.3 | 14.3 |
| Unidentified Solids (by difference) | 2.9 | 17.9 |
| Total | 100.0 | 100.0 |

This influent is passed by downflow through a 4-foot-deep 3.12 cu. ft. bed of a cation-exchange resin such as "Nalcite MX," in the hydrogen cycle, at a rate of about 1 gal./sq. ft./minute, and then through a 4-foot-deep 2.10 cu. ft. bed of an anion-exchange resin such as "Duolite A-3," in the hydroxyl cycle, at a rate of about 1.5 gal./sq. ft./minute. The relative areas of the beds are such as to permit continuous series flow at these rates. The influent mother liquor is followed by a wash of 340 lb., or 41.0 gal., of water to sweeten-off the unit.

The effluent from the demineralizing unit consists first of a sweetening-on fraction of 310 lb., or 37.5 gal., containing less than one pound of lactose, which is discarded. This is followed by a main fraction of 220 lb., or 25.8 gal., having a pH of 7.0 and the following composition:

TABLE 5

| | Wet Basis | Dry Basis |
|---|---|---|
| | Per cent | Per cent |
| Water | 90.2 | |
| Lactose | 7.3 | 74.4 |
| Ash | .45 | 4.6 |
| Protein (N×6.6) | 1.1 | 11.2 |
| Unidentified Solids (by difference) | .95 | 9.8 |
| Total | 100.00 | 100.0 |

Finally a 400 lb., or 45.5 gal., sweetening-off fraction is collected having approximately the same composition as shown in Table 3. This fraction is used in diluting the next charge of mother liquor.

The main fraction is then concentrated in a vacuum pan to a solids content of about 60 percent. This concentrate amounts to 35.9 lb. or 3.4 gal., and has the following composition:

TABLE 6

| | Wet Basis | Dry Basis |
|---|---|---|
| | Per cent | Per cent |
| Water | 39.4 | |
| Lactose | 44.7 | 73.9 |
| Ash | 2.8 | 4.6 |
| Protein (N×6.6) | 6.8 | 11.2 |
| Unidentified Solids (by difference) | 6.3 | 10.3 |
| Total | 100.0 | 100.0 |

On cooling the concentrate, centrifuging, washing and drying, 10.5 lb. dry crystalline lactose is obtained, representing 61 percent of the 17.3 lb. lactose present originally in the mother liquor charged to the process. Approximately as much lactose is present in the sweetening-off water as was added in diluting the 100 pound charge of primary liquor.

The centrifugate and washings constitute a secondary mother liquor which may be further processed as described above. This mother liquor has the following composition:

TABLE 7

| | Wet Basis | Dry Basis |
|---|---|---|
| | Per Cent | Per Cent |
| Water | 67.0 | |
| Lactose | 16.2 | 49.1 |
| Ash | 2.9 | 8.9 |
| Protein (N×6.6) | 7.2 | 21.8 |
| Unidentified Solids (by difference) | 6.7 | 20.2 |
| Total | 100.0 | 100.0 |

The dry crystalline lactose produced has the following composition:

TABLE 8

| | Per cent |
|---|---|
| Water | 1.16 |
| Lactose | 97.90 |
| Ash | .40 |
| Acidity (as lactic acid) | .04 |
| Fat | .10 |
| Protein (N×6.6) | .30 |
| Unidentified substances (by difference) | .10 |
| Total | 100.00 |

After exhaustion, the ion-exchange beds are regenerated by treating respectively in two steps with dilute sulfuric acid and with dilute sodium hydroxide. The first step employs respectively acid and alkali derived from a previous regeneration, while the second step employs fresh acid and alkali. The beds are then rinsed with soft water, furnishing respectively the dilute acid and alkali effluents referred to above, used in subsequent regeneration. Then the beds are rinsed in series with water, the slightly acid rinse from the cation-exchange bed being run through the anion-exchange bed. Finally the beds are back-washed with water to agitate the resin granules and, after settling, to ensure uniform flow of liquor through them.

Example II

A main effluent fraction from the ion-exchange unit, having the composition shown in Table 5, instead of being worked up directly for lactose as described in Example I, is mixed with deproteinized whey which has been concentrated to a 30–25 percent solids content and filtered to remove nitrogeneous material and ash rendered insoluble by the concentration step.

220 pounds fo such main fraction (Table 5) is mixed with 120 pounds of the deproteinized concentrated, filtered whey, which has the following composition:

TABLE 9

| | Wet Basis | Dry Basis |
|---|---|---|
| | Per Cent | Per Cent |
| Water | 64.5 | |
| Lactose | 28.9 | 81.5 |
| Ash | 3.3 | 9.2 |
| Protein (N X 6.6) | 2.3 | 6.5 |
| Unidentified Solids (by difference) | 1.0 | 2.8 |
| Total | 100.0 | 100.0 |

The mixed solutions are then concentrated in a vacuum pan to approximately 60 percent solids. On cooling, centrifuging, washing and drying, 31 pounds dry crystalline lactose is obtained, representing 61 percent of the theoretical yield, of which approximately 70 percent is contributed by the whey, i. e. the normal yield of the conventional crystallization process, and approximately 30 percent is contributed by the mother liquor, i. e. the gain in yield due to the use of our process.

A secondary mother liquor is produced which may be further worked up as described in Example I.

From the above disclosure it will be seen that we have provided a simple and economical method of recovering additional lactose from conventional recrystallizing operations in producing lactose from whey, and that our process requires no modification of the conventional apparatus and process steps, but is simply an addition thereto.

We claim:

1. The process of recovering lactose which comprises: providing a mother liquor from a lactose-crystallization process, the mother liquor containing about 35 percent solids of which approximately one-half is lactose, more than one-fifth is ash and more than one-seventh is nitrogenous material calculated as protein, diluting the mother liquor to a solids content of 13–17 percent by adding thereto water and sweetening-off water derived from a previous demineralizing operation, passing the diluted solution successively through a bed of cation-exchange resin in the hydrogen cycle and a bed of ion-exchange resin in the hydroxyl cycle, the amount of resin and time of contact being such as to remove at least about 85 percent of the ash, whereby at least 50 percent of the nitrogenous material calculated as protein and a substantial fraction of other non-lactose solids are also removed, rinsing the resin beds with water, collecting a first effluent fraction containing at least about 10 percent of solids of which about three-quarters is lactose, collecting a second fraction of effluent as sweetening-off water, concentrating the first fraction to a crystallizing point by vacuum evaporation, permitting the concentrate to cool, separating the resulting lactose crystals from mother liquor, and utilizing the sweetening-off water for dilution in a subsequent similar operation.

2. A process according to claim 1 in which concentration and crystallization of the demineralized lactose solution are effected after admixture thereof with whey.

3. A process according to claim 1 in which concentration and crystallization of the demineralized lactose solution are effected after admixture thereof with deproteinized whey.

WILLIAM J. PRATT.
HOWARD F. SEIBERT.
REXFORD C. STRIBLEY.

REFERENCES CITED

The following references are of record in the file of this patent:

UNITED STATES PATENTS

| Number | Name | Date |
|---|---|---|
| 359,575 | Smit | May 11, 1943 |
| 2,319,648 | Walsh | May 18, 1943 |
| 2,388,194 | Vallez | Oct. 30, 1945 |
| 2,389,119 | Cantor | Nov. 20, 1945 |
| 2,391,843 | Rawlings | Dec. 25, 1945 |
| 2,465,906 | Meade | Mar. 29, 1949 |
| 2,477,558 | Almy et al. | Aug. 2, 1949 |